United States Patent [19]

Attar et al.

[11] Patent Number: 5,779,040
[45] Date of Patent: Jul. 14, 1998

[54] APPARATUS FOR HOLDING AN ARTICLE

[75] Inventors: Shanas Attar, 1028 7th St., #202, Santa Monica, Calif. 90403; Donal Gibson, 2700 Neilson Way, #1536, Santa Monica, Calif. 90405; Sean Lawlor, 950 Second St., #107, Santa Monica, Calif. 90403

[73] Assignees: Shanas Attar; Donal Gibson; Sean Lawlor, all of Santa Monica; Icon F/X, Inc., Burbank, all of Calif.

[21] Appl. No.: 736,132

[22] Filed: Oct. 24, 1996

[51] Int. Cl.⁶ ............................................. B65D 85/57
[52] U.S. Cl. ........................ 206/310; 206/308.1; 206/232; 220/345; 312/9.3; 312/9.48
[58] Field of Search .................. 206/308.1, 309–313, 206/493, 387.12, 232; 220/345, 349; 312/9.2, 9.3, 9.47, 9.48, 9.52

[56] References Cited

U.S. PATENT DOCUMENTS

| | | | |
|---|---|---|---|
| 4,771,883 | 9/1988 | Herr et al. | 206/308.1 |
| 4,807,749 | 2/1989 | Ackeret | 206/309 |
| 4,874,085 | 10/1989 | Grobecker et al. | |
| 5,190,153 | 3/1993 | Schultz et al. | 206/308.1 |
| 5,244,085 | 9/1993 | Lammerant et al. | 206/308.1 |
| 5,249,677 | 10/1993 | Lim | |
| 5,285,897 | 2/1994 | Ozaki | 312/9.52 |
| 5,310,053 | 5/1994 | Lowry et al. | |
| 5,332,089 | 7/1994 | Tillet et al. | |
| 5,360,107 | 11/1994 | Chasin et al. | |
| 5,366,073 | 11/1994 | Turrentine et al. | |
| 5,381,894 | 1/1995 | Misterka et al. | |
| 5,383,554 | 1/1995 | Cowan | |
| 5,385,235 | 1/1995 | Ikebe et al. | |
| 5,388,713 | 2/1995 | Taniyama | 206/308.1 |
| 5,427,236 | 6/1995 | Kramer | |
| 5,474,174 | 12/1995 | Lin | |
| 5,494,156 | 2/1996 | Nies | |
| 5,520,279 | 5/1996 | Lin | |
| 5,533,614 | 7/1996 | Walker | |
| 5,549,199 | 8/1996 | Lindsay | |

*Primary Examiner*—Paul T. Sewell
*Assistant Examiner*—Luan K. Bui
*Attorney, Agent, or Firm*—Blakely, Sokoloff, Taylor & Zafman, LLP

[57] ABSTRACT

An apparatus for holding a disk-like article such as a compact disc or CD-ROM is disclosed. A shell has a pair of grooves inside the sidewalls. A tray for holding the compact disc has a pair of hooks which engage the grooves to allow the tray to slide into and out of the shell. The compact disc is held by a heart shaped as a cylinder including bumps around the cylinder to prevent the compact disc from sliding off the heart. Alternatively, a continuous rib may be used instead of the bumps. Another version of the heart is made of a flexible but resilient material which allows the compact disc to snugly fit over the heart. In the latter embodiment, one can remove the compact disc by pressing down onto the heart to release the compact disc.

20 Claims, 8 Drawing Sheets

APPARATUS FOR HOLDING AN ARTICLE

BACKGROUND

This invention relates to containers for storing and displaying an article such as an information recording medium commonly known as a compact disc or CD-ROM.

A conventional compact disc holder is essentially a plastic box with a hinged lid, the so-called "jewel box" design. Swinging the lid open reveals a circular recess for receiving a compact disc. The user forces the compact disc against a circular projection at the center of the recess, causing clasps on the projection to securely grip the compact disc. The projection and the clasps arranged in a circle are collectively referred to as a "rosette". To remove the compact disc, the user typically grasps it from the sides and pulls it off the rosette.

Although in widespread use, the above described compact disc holder has several drawbacks. At the outset, the user may find it difficult to immediately tell which end to lift in order to open the box. Moreover, repeated opening and closing of the lid weakens the plastic hinges, eventually resulting in their breaking. To overcome this particular problem, the use of a drawer-type container has been suggested.

Another difficulty associated with the current jewel box design arises when trying to remove the compact disc itself. Unless the proper amount of force is applied to a precise location on the rosette at the same time the compact disc is lifted, removing the compact disc without bending it becomes virtually impossible as the clasps firmly grip the compact disc.

Inserting and removing the booklet accompanying the compact disc has also been problematic with existing jewel box designs. The tabs which hold the booklet against the lid are difficult to clear when trying to insert the booklet into place. Removing the booklet presents a no less challenging task. The booklet typically lies tightly and entirely against the lid, making it difficult to simply grab and pull out the booklet.

A new compact disc holder is therefore needed to overcome the above mentioned disadvantages. In particular, the compact disk should be easily removable from the holder by a person using bare fingers. Such a new design, however, must also be inexpensive to manufacture in large quantities, and preferably have the same outside dimensions as the current design to remain compatible with existing compact disc holder storage racks.

SUMMARY

In its preferred embodiment, this invention presents a compact disc holder having the same outside dimensions as the existing jewel box design, and using only two plastic pieces to reduce manufacturing costs. A tray holding the compact disc slides into a shell through an opening, the tray being guided by a pair of pins on either side of it running inside grooves which are molded into the interior sidewalls of the housing. Each pin may be attached to a support member which helps maintain the booklet concerning the compact disc against the roof of the shell. To insert the tray into the shell, the support members are pushed towards each other and held while the tray is inserted into the shell and the pins have engaged the grooves. To prevent the tray from being completely pulled out of the housing, a pair of stops are added to the grooves near the opening so that the pins abut against the stops when the tray is in its open position.

The compact disc itself is suspended slightly above and extending beyond a raised island on the tray and is held in place by a heart. In one embodiment, the heart has a cylindrical shape with a slight taper, the base of the cylinder being larger than its top. Retaining bumps or a rib may be added around the cylinder to secure the compact disc on the heart without substantially impairing the removal of the compact disc. A dual rib design for the heart allows two compact discs to be suspended in the same box. In another embodiment, the heart is made of a flexible and resilient compound where the compact disc is pushed onto and fits snugly on the heart. By pressing down at the center of the heart, the compact disc may be easily pulled off the tray.

Another advantageous feature of the tray is the absence of sidewalls which allow freer access to the compact disc.

This invention also includes a notch in the shell which facilitates removal of a booklet in the shell by grasping the booklet at its edge exposed by the notch and pulling out the booklet.

To ensure the tray remains closed, a mating bump and recess pair appears on the tray and shell, respectively.

DRAWINGS

The features and advantages of this invention are better understood by referring to the figure, description, and claims below.

DESCRIPTION

Figure 1:
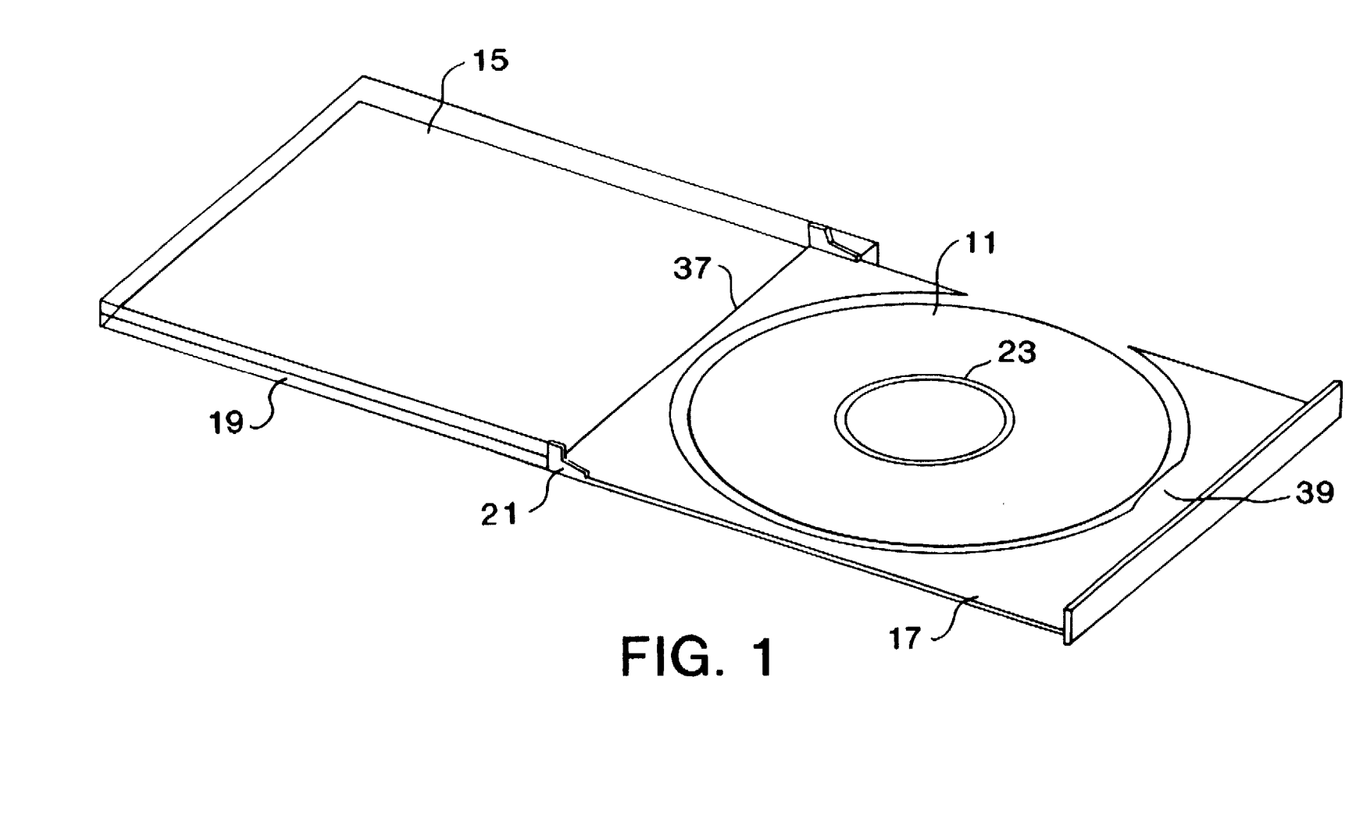
FIG. 1 is a perspective plan view of a preferred embodiment of this invention with the tray in an open position.
Figure 13:
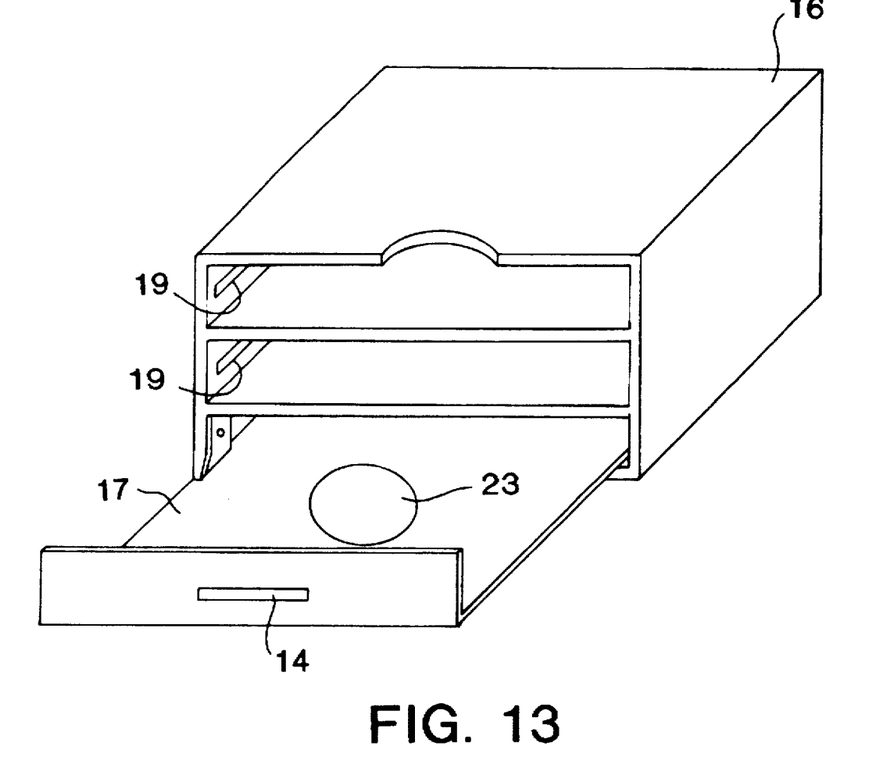
FIG. 13 shows an embodiment of the invention for holding three compact discs in three trays.

This invention relates to a compact disc or CD-ROM holder which allows easier access to a compact disc 11 than with conventional compact disc holders. Referring to FIG. 1, a preferred embodiment of the invented compact disc holder has a rectangular shell 15 which includes a floor and a roof separated by a left wall and a right wall, with an opening between the walls at the front of the shell 15. A tray 17 is designed to slide into the shell 15 via the front opening. The tray 17 slides along two grooves 19 formed inside the shell 15 and running substantially the length of each wall. The tray 17 has two hooks 21 formed at its rear end, each hook 21 adapted to slidably engage a respective groove 19. For holding multiple compact discs, an embodiment is shown in FIG. 13 wherein the stacked shell 16 has three sets of grooves 19 allowing the use of three trays 17 (only one shown with a handle 14).

Figure 2A:
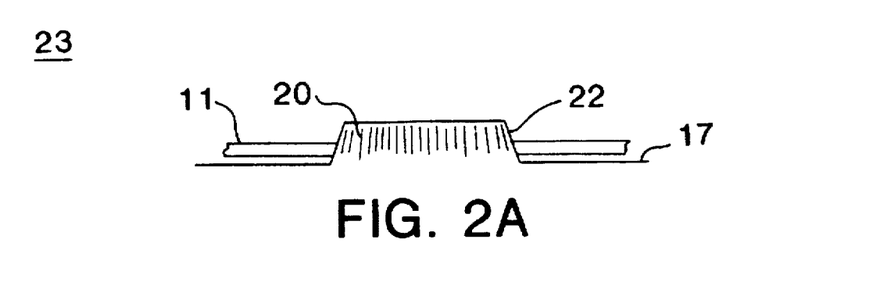
FIGS. 2A-2D are cross-sectional side views of various embodiments of the heart.

At approximately the center of the tray 17 lies a cylinder-shaped protrusion referred to herein as a heart 23. Several embodiments of the heart 23 are shown in FIGS. 2A–2D. The cylinder may be straight-walled 24 as shown in FIG. 2C, or it may be tapered 22 as in FIGS. 2A and 2B. The cylinder can also have many small vertical ridges 20 as shown in FIG. 2A, but will typically have a more or less circular cross-section. In one embodiment, the cylinder can be made of a hard material such as the same plastic used in conventional compact disc holders. The base of the heart 23 lies against the tray 17 and is typically of a larger diameter than the central circular aperture of a compact disc or CD-ROM 11. The heart 23 should not be so high as to prevent the tray 17 from smoothly sliding into and out of the shell 15. After having moved the tray 17 to an open position extending outside the shell 15, the user places the compact disc 11 on the tray 17 by fitting the center hole of the compact disc 11 over the top of the heart 23. With a tapered cylinder 22, the compact disc 11 fits over the cylinder and rests against the cylinder wall slightly above the tray 17 where the tapered cylinder 22 diameter is larger than that of the center hole in the compact disc 11. In one embodiment, the top of the heart 23 tapers inwards from the base by an annular radius of 0.75 millimeter, i.e., the top has a diameter 1.5 millimeters less than the base diameter.

Figure 2B:
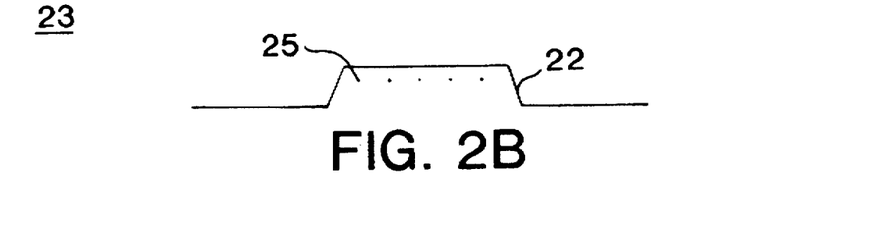
Figure 2C:
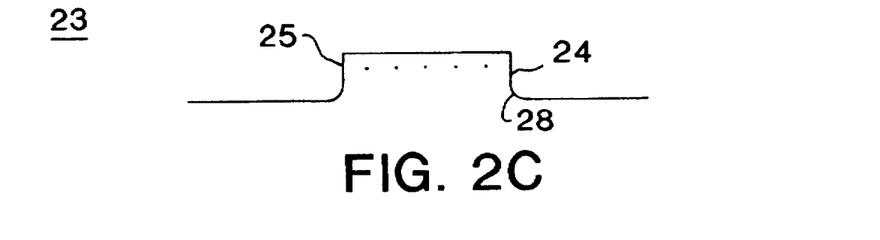

FIGS. 2B and 2C also show small bumps 25 formed around the cylinders 22 and 24 to ensure that the compact disc 11 does not slide off the heart 23. The bumps 25 are typically rounded protrusions that are evenly spaced and can number from just a few to a dozen or more depending upon the material used and their overall shape and size. The bumps 25 should not substantially impair the placement or removal of the compact disc 11. They are intended to secure the compact disc 11 against the heart 23 in the event the holder is turned upside down or receives a jolt while being carried.

Figure 2D:
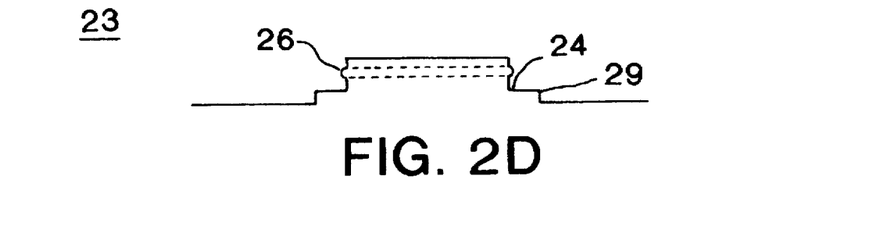

FIG. 2D shows another embodiment of the heart 23 having a continuous horizontal rib 26 circling the straight-walled cylinder 24. The rib 26 typically has a thickness of 0.25 mm and height of 0.3 mm. Once again, the idea is to prevent the compact disc 11 from sliding off the heart 23 without substantially impairing the removal of the compact disc 11.

In the embodiments having a straight-walled cylinder 24 in FIGS. 2C and 2D, a flange is formed near the base of the cylinder to keep the compact disc 11 positioned above the tray 17. The flange may be shaped as a skirt 28 or a flat shelf 29 as shown. The compact disc 11 is held between the flange 29 and the bumps 25 or rib 26. The flange 29 can extend outwards up to the boundary of the compact disc 11 where recorded information is stored.

Figure 3:
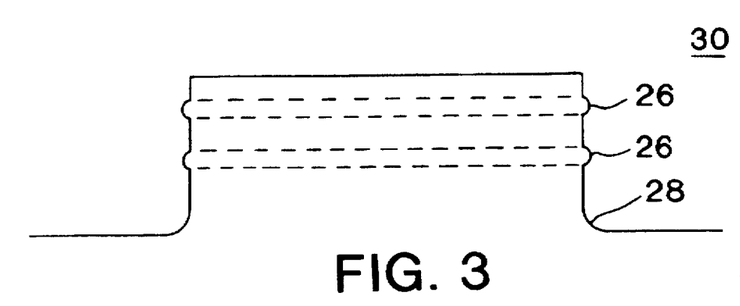
FIG. 3 is a cross-sectional view of a heart for holding two compact discs.

FIG. 3 shows a heart dual compact disc 30 for holding two compact discs 11, a first compact disc 11 held between the lower rib 26 and the skirted flange 28, and a second compact disc 11 held between the lower and upper ribs 26.

Figure 4:
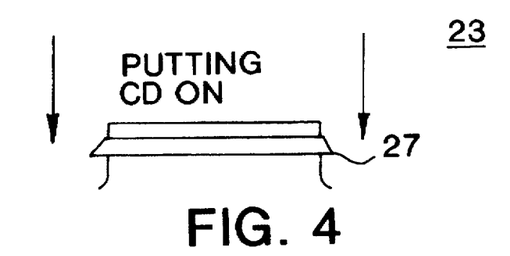
FIG. 4 shows the heart with a lip for holding the compact disc.
Figure 5:
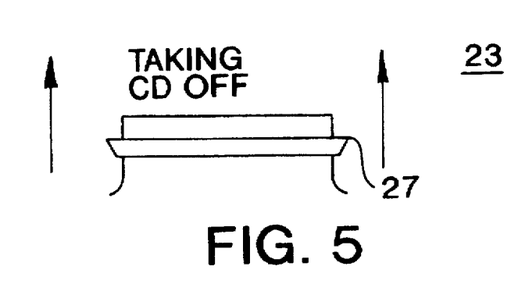
FIG. 5 shows the heart with a lip when the compact disc has been removed.

A variation of the rib 26 is shown in FIGS. 4 and 5 as a flexible lip 27. Where the rib 26 is typically made of a rigid material such as plastic, the lip 27 is formed of a rubber-like material. The lip 27 may assume two positions: down to hold the compact disc 11 as in FIG. 4, and up, after the compact disc 11 has been removed as in FIG. 5.

Figure 6:
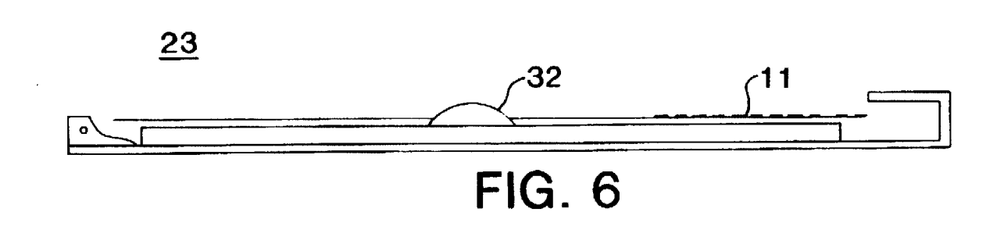
FIG. 6 shows a bubble-shaped heart.

In a final embodiment of the heart 23 shown in FIG. 6, a bubble-like portion of a sphere made of a flexible and resilient material grips the compact disc 11 in its center hole after the compact disc 11 has been pushed down upon the heart 23. To release the compact disc 11, the user presses down the bubble 32. The material used should be very flexible and resilient, capable of withstanding high temperatures such as those found inside an automobile that has been left in the sun for several hours. This same material can also be used in a straight-walled 24 version of the heart 23 as shown in FIGS. 2C and 2D.

Figure 7:
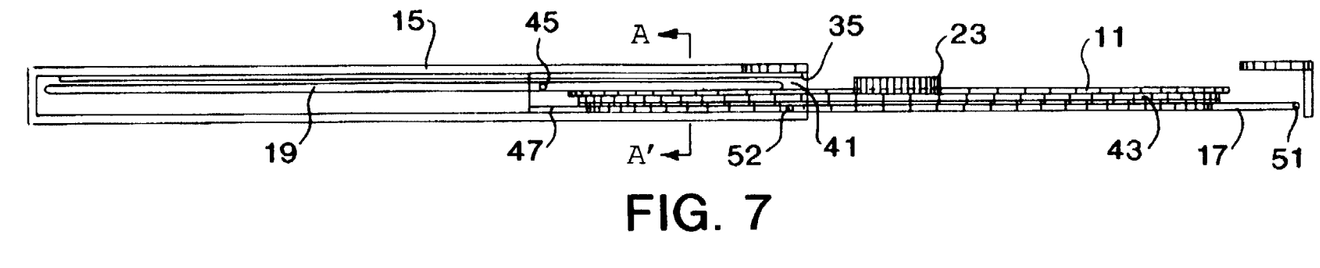
FIG. 7 is a side view of the preferred embodiment of the compact disc holder including the plane A-A'.
Figure 8:
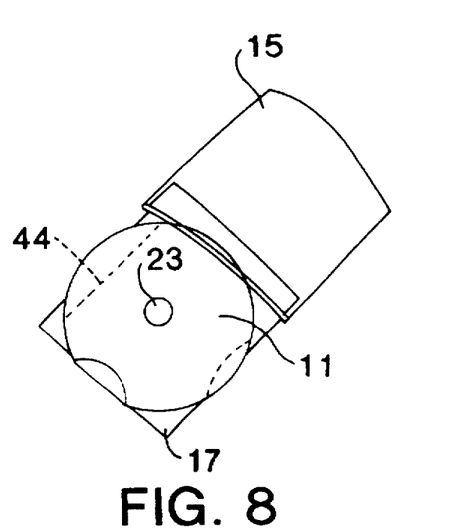
FIG. 8 is a top view of the compact disc holder.

In a preferred embodiment of this invention shown in FIG. 7, an island 43 is formed on the tray 17 for receiving the compact disc 11 with the heart 23 formed atop the island 43. The island 43 is typically circular, although it may be shaped as a polygon, and allows the user to readily identify the location of the compact disc 11 when the tray 17 is in its open position. The island 43 also allows the compact disc 11 to sit above the tray 17 so that the user can grasp the compact disc 11 at its edges without having to first lift the compact disc 11. To further facilitate grasping the compact disc 11, the island 43 should have a diameter slightly smaller than the compact disc 11 diameter such that the compact disc 11 extends slightly beyond the periphery of the island 43. If no island 43 is used, then the tray 17 may have a waist 44 such that the compact disc 11, when placed on the heart 23, could extend slightly beyond the left and right edges of the waist 44 as shown in FIG. 8.

Figure 9:
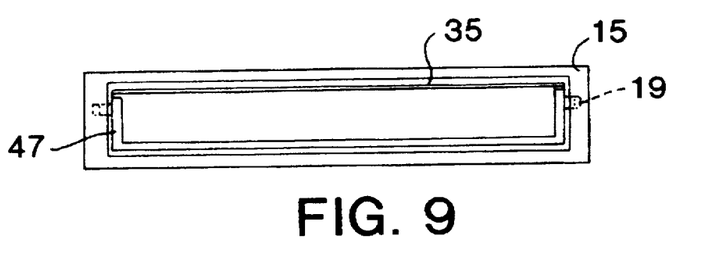
FIG. 9 is a front cross-sectional view of the preferred embodiment cut through plane A-A'.
Figure 10:
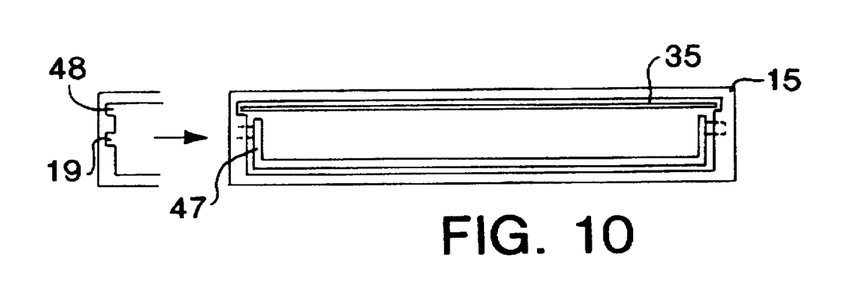
FIG. 10 is a front cross-sectional view of another embodiment cut through plane A-A'.

In addition to holding the compact disc or CD-ROM 11, the invented compact disc holder can also carry a booklet 35 concerning the compact disc 11. For example, the booklet 35 may contain lyrics for songs recorded on the compact disc 11. With that in mind, FIG. 9 shows the shell 15 including the booklet 35. In the preferred embodiment, the booklet 35 is inserted through the opening in the shell 15 and held between the top of the support member 47 and the roof. In another embodiment, the booklet 35 is inserted into a pair of second grooves 48 formed above the first grooves 19 as shown in FIG. 10. Because the second grooves 48 run uninterrupted along each wall, the booklet 35 may be inserted into place without having to clear any obstacles. To allow easy entry and insertion of the booklet 35, the second grooves 48 extend the entire way up to the opening of the shell 15 so that the user can readily identify the gap in which the booklet 35 is to be inserted.

Removing the booklet 35 from the housing 31 is also improved over the prior art by the addition of a curved notch 37 in the roof near the opening as shown in FIG. 1. The notch 37 exposes a portion of the booklet 35 and allows the user to grip the booklet 35 at that location and pull out the booklet 35 when the tray 17 is in its open position. A tongue 39 raised above and attached to the tray 17 mates with the notch 37 when the tray 17 is in its closed position. The tongue 39 can be made of a molded plastic as the rest of the tray, or a softer, more flexible, but still resilient material. The tongue surface can be smooth or it may have ridges and indentations to aid in gripping it. Alternatively, little bumps can be added to the tongue surface rendering it rougher for easier gripping. The tongue 39, however, should not be so large as to restrict the removal of the compact disc 11 from the tray 17. The tongue 39 and notch 37 may also act as a closure mechanism to keep the tray 17 in its closed position. In addition, as shown in FIG. 7, a bump 51 and recess 52 pair located on the tray 17 and shell 15 sidewall, respectively, can also be used to maintain the tray 17 closed.

In the preferred embodiment, the tray 17 (including the heart 23 and the tongue 39) and the housing 31 are both made of a hard but resilient plastic material commonly used in conventional compact disc holders. Using this material allows the grooves 19 and 48 to be molded into the walls.

To prevent the tray 17 from being removed completely out of the shell 15 when being pulled to its open position, a stop 41 can be provided at a fixed position in each groove to act as a stop 41 surface for the respective hook 21. The stop 41 surface will preferably be formed near the opening of the shell 15 such that when the tray 17 has been pulled to its outermost position and the hooks 21 abut against the stop 41 surface, the compact disc 11 can be easily removed from the tray 17 and will clear the shell 15 and the tongue 39.

Figure 11:
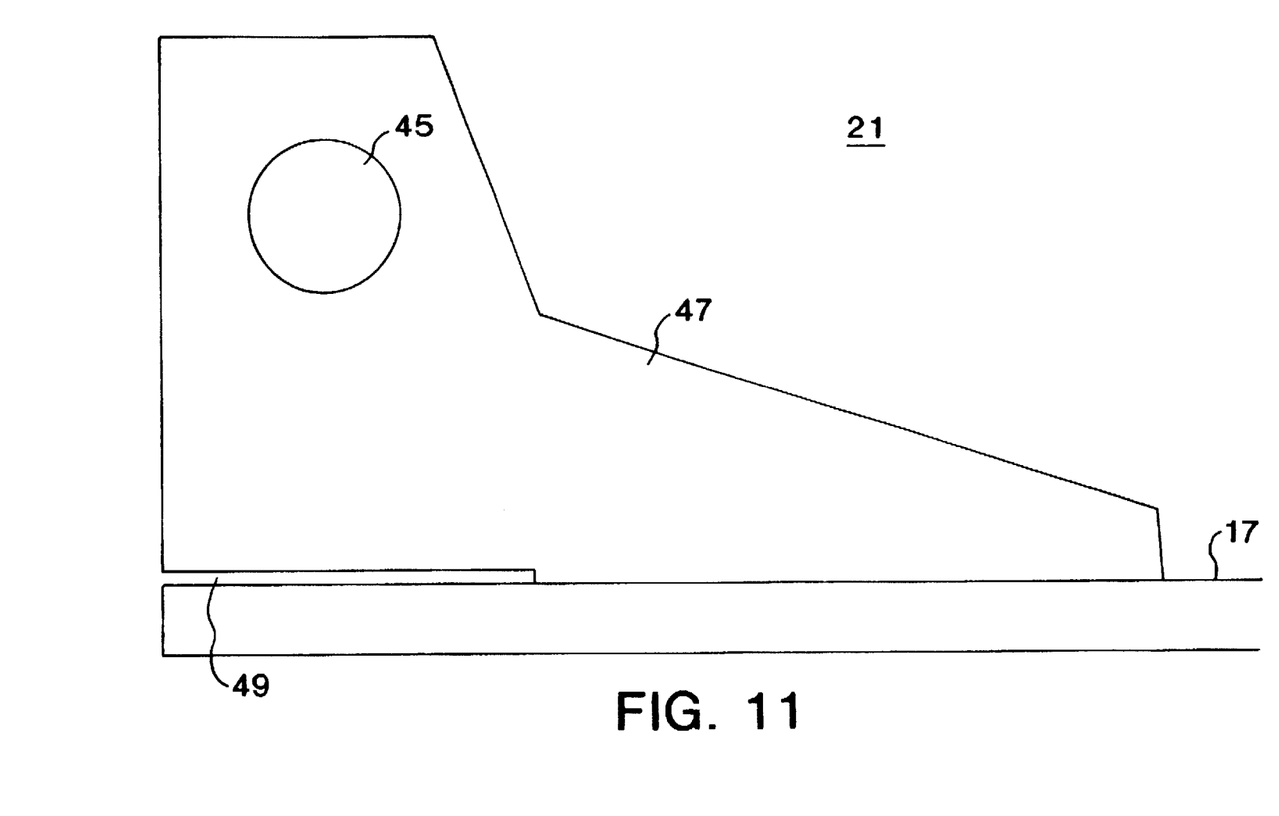
FIG. 11 is a side view of the hook.
Figure 12:
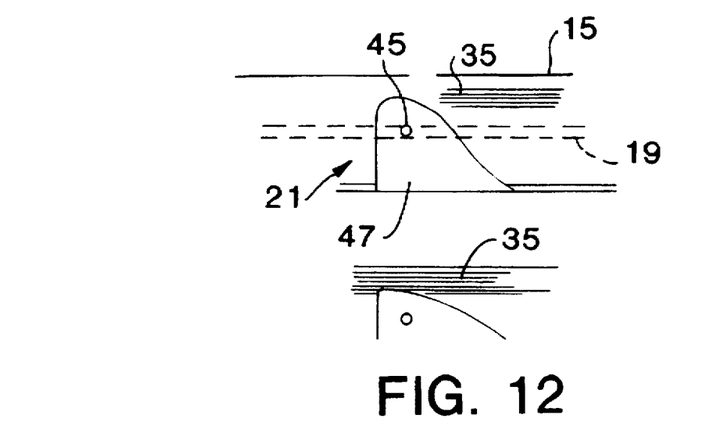
FIG. 12 shows the hook holding the booklet inside the compact disc holder.

Details concerning the hook 21 are shown in FIGS. 11 and 12. In one embodiment, the hook 21 is a cylindrical pin 45 attached to a vertically oriented support member 47 on the tray 17. The support member 47 has a more or less trapezoidal shape as shown in FIGS. 7 and 11, and rises vertically from the tray 17 to a height slightly smaller than the inside height of the shell 15. For improving the assembly process, a small space 49 may be added between the support member 47 and the tray 17 as shown in FIG. 11 to aid in compressing the support members 47 when inserting the tray 17 into the shell 15. The support members 47 are slightly compressed inwards at the pin 45 while the tray 17 is inserted into the shell 15 until the pins have engaged the first grooves 19.

Although the pin 45 and groove 19 combination shoulders most of the force required to maintain the tray 17 parallel to the grooves 19 in the open and closed position, the support member 47 can also assist by retaining the booklet 35 against the roof as shown in FIG. 12. To ease the insertion of the booklet 35 into place, the support member 47 has a rounded corner as shown in FIG. 12.

Figure 14:
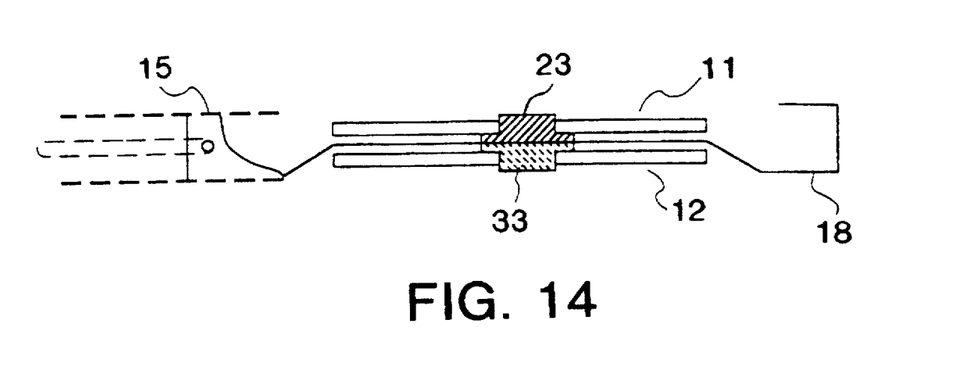
FIG. 14 is a cross-sectional view of an embodiment of the tray for holding two compact disc.

FIG. 14 shows an embodiment of the compact disc holder with dual heart tray 18 wherein a second compact disc 12 is held on a lower heart 33 formed on the bottom side of the dual heart tray 18. The lower heart 33 can be any one of the ones discussed earlier and shown in FIGS. 2A–2D and 6. To allow such a scheme, the dual heart tray 18 has a recess in its bottom side to receive lower heart 33 and compact disc 12. The dual heart tray 18 also fits within original shell 15.

Figure 15:
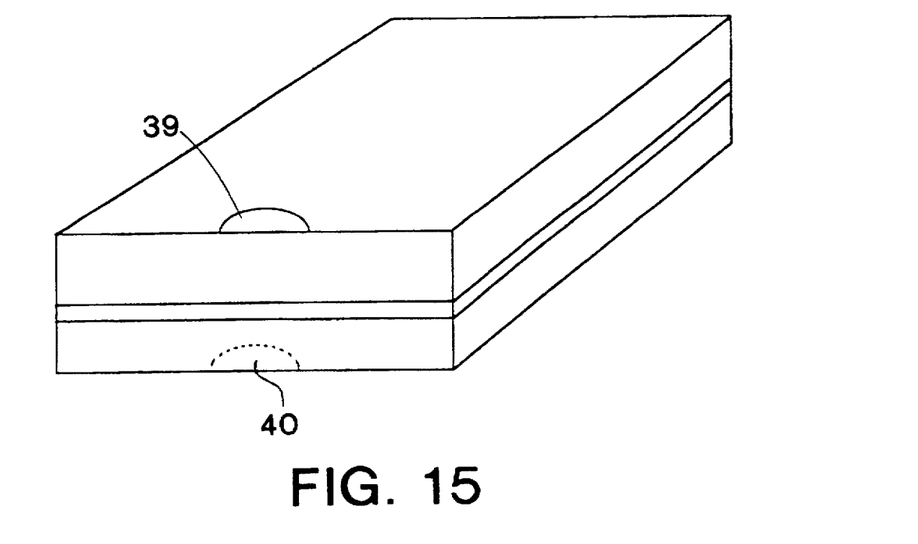
FIG. 15 is a plan view of a compact disc holder having a pair of back to back trays.

FIG. 15 shows yet another embodiment of the compact disc holder for holding two compact discs. Two identical trays 17 are positioned back to back with the hearts facing opposite directions. This symmetrical design requires the user to turn over the compact disc holder and use lower tongue 40 to pull out the second tray 17. In practice, it may be possible to attach two shells 15 back to back to achieve the embodiment in FIG. 15.

The embodiments of the compact disc holder described above for exemplary purposes are, of course, subject to other variations in structure and material within the capabilities of one reasonably skilled in the art. Thus, the details above should be interpreted as illustrative and not in a limiting sense.

What is claimed is:

1. An apparatus for holding a disk, comprising:
    a shell defined by a roof, a shell floor, a left wall and a right wall extending between the roof and the shell floor, and an opening therebetween, a pair of first grooves, each wall having one of the first grooves inside the shell running substantially the length of the respective wall; and
    a tray having a first end and a second end for holding the disk, the tray having a pair of hooks at the first end, each hook having a support member on the tray, and a pin attached to the support member, the pin sized to slidably engage a respective one of said first grooves allowing the tray to be moved between a closed position and an open position, the tray resting against the shell floor while substantially extending beyond the opening in the open position and substantially lying within the shell in the closed position.

2. An apparatus according to claim 1 further comprising a heart formed atop the tray and shaped as a cylinder having a base and a top opposing each other, the base lying against the tray, the cylinder having a diameter sized to receive a circular aperture in the disk.

3. An apparatus according to claim 2 wherein the cylinder is made of a flexible but resilient material.

4. An apparatus according to claim 2 further comprising a plurality of bumps formed around the cylinder for securing the disk on the tray.

5. An apparatus according to claim 2 further comprising a rib formed around the cylinder for securing the disk on the tray.

6. An apparatus according to claim 2 further comprising a flexible lip formed around the cylinder for securing the disk on the tray.

7. An apparatus according to claim 2 wherein the cylinder is tapered such that the base has a diameter larger than the top, the base diameter being larger than that of the circular aperture in the disk.

8. An apparatus according to claim 7 wherein the base of the cylinder is approximately 1.5 mm larger than the top in diameter.

9. An apparatus according to claim 2 wherein the cylinder has a peripheral flange at its base for holding the disk without the article substantially touching the tray.

10. An apparatus according to claim 2 further comprising an island having a periphery and formed on the tray, and wherein the heart is formed atop the island, the island sized so that the disk, when placed on the tray, extends beyond the periphery of the island.

11. An apparatus according to claim 1 further comprising a notch in the roof near the opening mated to a tongue at the second end of the tray, the tongue substantially filling the notch with the tray in its closed position, the notch for allowing removal of a flat article from the shell with the tray in its open position.

12. An apparatus according to claim 1 further comprising a bump on the tray near the second end, and a recess in the shell near the opening, the bump and the recess mated for maintaining the tray in its closed position.

13. An apparatus according to claim 11 wherein one of the walls further comprises a second groove running substantially the length of the wall inside the shell, the flat groove adapted to receive the second article through the opening.

14. An apparatus according to claim 1 further comprising stop means for preventing the tray from being completely moved outside the shell.

15. An apparatus according to claim 14 wherein the stop means comprises a stop surface formed in each first groove near the opening.

16. An apparatus according to claim 1 wherein the tray and the shell are made of plastic, the disk is a compact disc, the flat article is a booklet concerning the compact disc, and the first grooves are molded into the walls.

17. An apparatus for holding a pair of disks each having a central circular aperture, comprising:
    a shell defined by a roof, a shell floor, a left wall and a right wall extending between the roof and the shell floor, and an opening there between, a pair of first grooves, each wall having one of the first grooves inside the shell running substantially the length of the respective wall;

a tray having a first end and a second end for holding the pair of disks, the tray having a pair of hooks at the first end, each hook having a support member on the tray, and a pin attached to the support member, the pin sized to slidably engage a respective one of said first grooves allowing the tray to be moved between a closed position and an open position, the tray resting against the shell floor while substantially extending beyond the opening in the open position and substantially lying within the shell in the closed position; and a pair of hearts formed on opposing sides of the tray, each heart shaped as a cylinder having a diameter sized to receive the circular aperture of a respective one of said disks.

18. An apparatus for holding a disk, comprising:

a rectangular shell defined by a roof, a shell floor, a left sidewall and a right sidewall extending between the roof and the shell floor, the shell being closed off at one end by a rear wall and having an opening at another end, each sidewall having one of a pair of first grooves inside the shell and running substantially the length of the respective wall, each one of said pair of first grooves having a stop surface formed therein near the opening; and a tray for holding the disk while lying flat on the tray, the tray having a first end and a second end, a pair of hooks at the first end, each hook having a support member rising vertically from the tray, and a cylindrical pin attached to the support member and extending parallel to the tray, the pin sized to slidably engage a respective one of said first grooves allowing the tray to be moved between a closed position and an open position, the tray resting against the shell floor while substantially extending beyond the opening in the open position and substantially lying within the shell in the closed position, a curved notch in the roof near the opening mated to a tongue at the second end of the tray, the tongue substantially filling the notch with the tray in its closed position, the notch having a curvature substantially the same as the curvature of the disk to allow sufficient clearance for removal of the disk from the tray with the tray in its open position.

19. An apparatus as in claim 18 further comprising a slit in each support member running parallel to the tray.

20. An apparatus as in claim 17 further comprising an island on a top side of the tray, the island defining a recess in a bottom side of the tray, and wherein one of said hearts is formed on the island and another is formed in the recess.

* * * * *

UNITED STATES PATENT AND TRADEMARK OFFICE
CERTIFICATE OF CORRECTION

PATENT NO. : 5,779,040  
DATED : July 14, 1998  
INVENTOR(S) : Attar et al.

Page 1 of 1

It is certified that error appears in the above-identified patent and that said Letters Patent is hereby corrected as shown below:

<u>Title page,</u>
After Item [21] Appl. No.:, delete "736,132" and add -- 08/736,132 --.

Signed and Sealed this

Fourteenth Day of May, 2002

Attest:

Attesting Officer

JAMES E. ROGAN
*Director of the United States Patent and Trademark Office*